Feb. 4, 1958   M. P. GOODKIN   2,821,882
APPARATUS FOR COPYING AND LIKE PURPOSES
Filed Oct. 4, 1954   3 Sheets-Sheet 1

INVENTOR.
MORTIMER P. GOODKIN
BY
Kenyon & Kenyon
ATTORNEYS

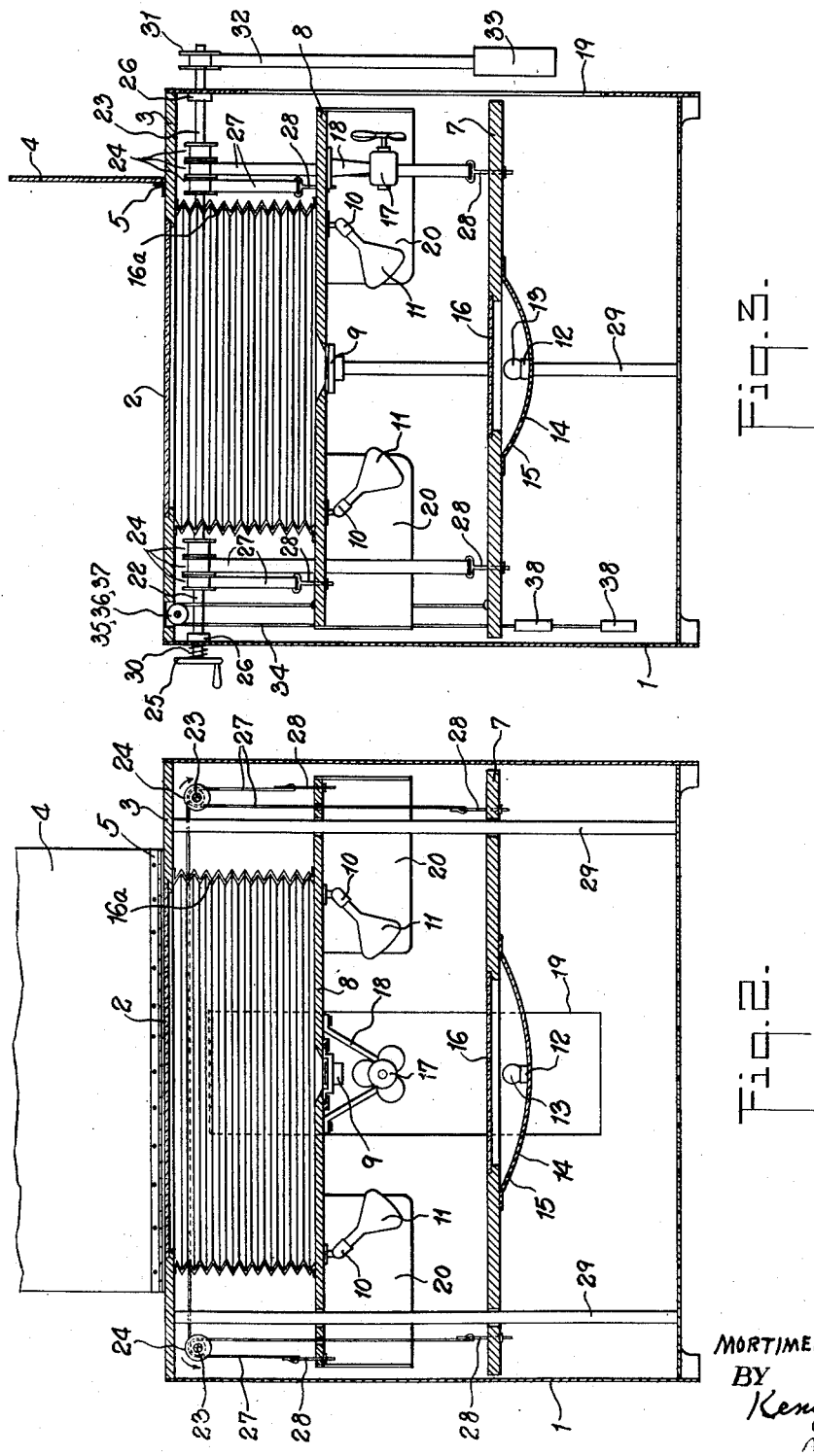

United States Patent Office 2,821,882
Patented Feb. 4, 1958

2,821,882

APPARATUS FOR COPYING AND LIKE PURPOSES

Mortimer P. Goodkin, Union, N. J.

Application October 4, 1954, Serial No. 459,983

2 Claims. (Cl. 88—24)

This invention relates to a projection apparatus and more particularly to an improved projection apparatus which may be used to project an image of an object onto an image plate for manual copying or for photographic copying, the image being either larger, the same size, or smaller than the object as desired.

One object of this invention is to provide an apparatus of this type in which the object supporting and lens supporting platens can be easily adjusted to insure their being parallel to the image plate. Another object is to provide an apparatus wherein the mechanism for moving the platens in relation to each other and to the image plate is simple in construction and provides a positive moving force which is easily controlled by the operator. A further object of the invention is to provide an apparatus which will project either opaque or transparent objects, which are either flat or three dimensional as desired and will permit of either manual copying or photographic copying as desired.

Figure 1:
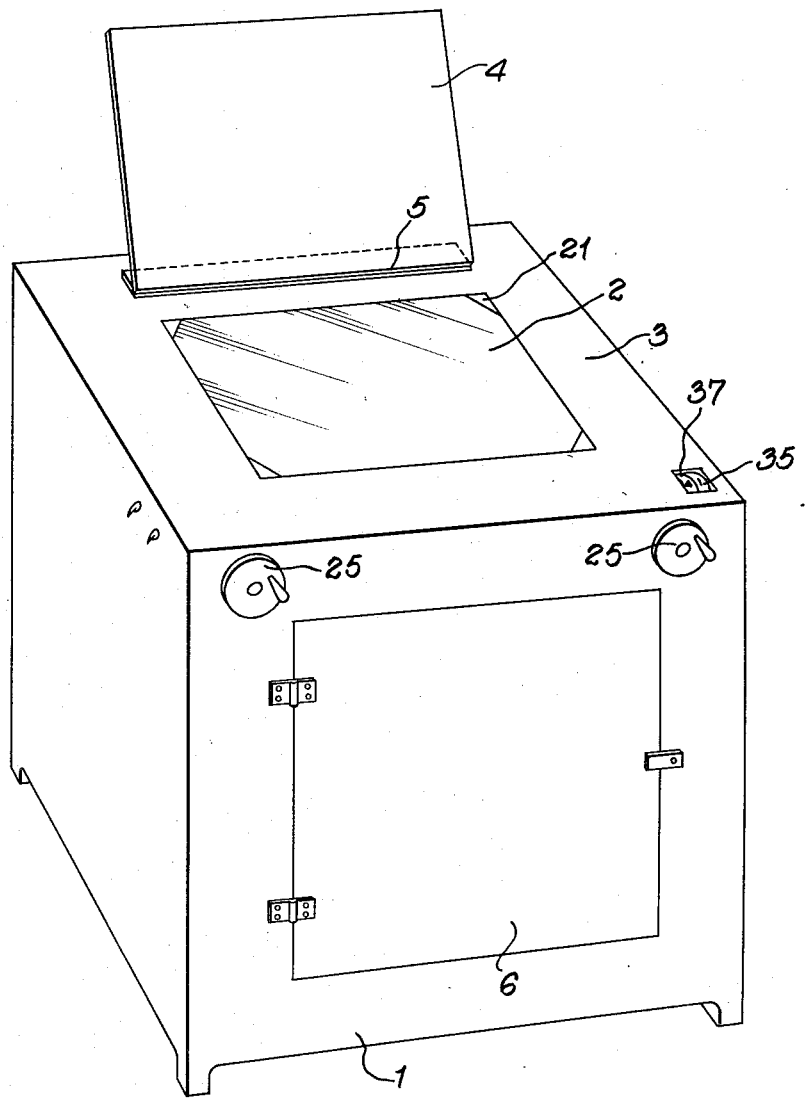
Figure 4:
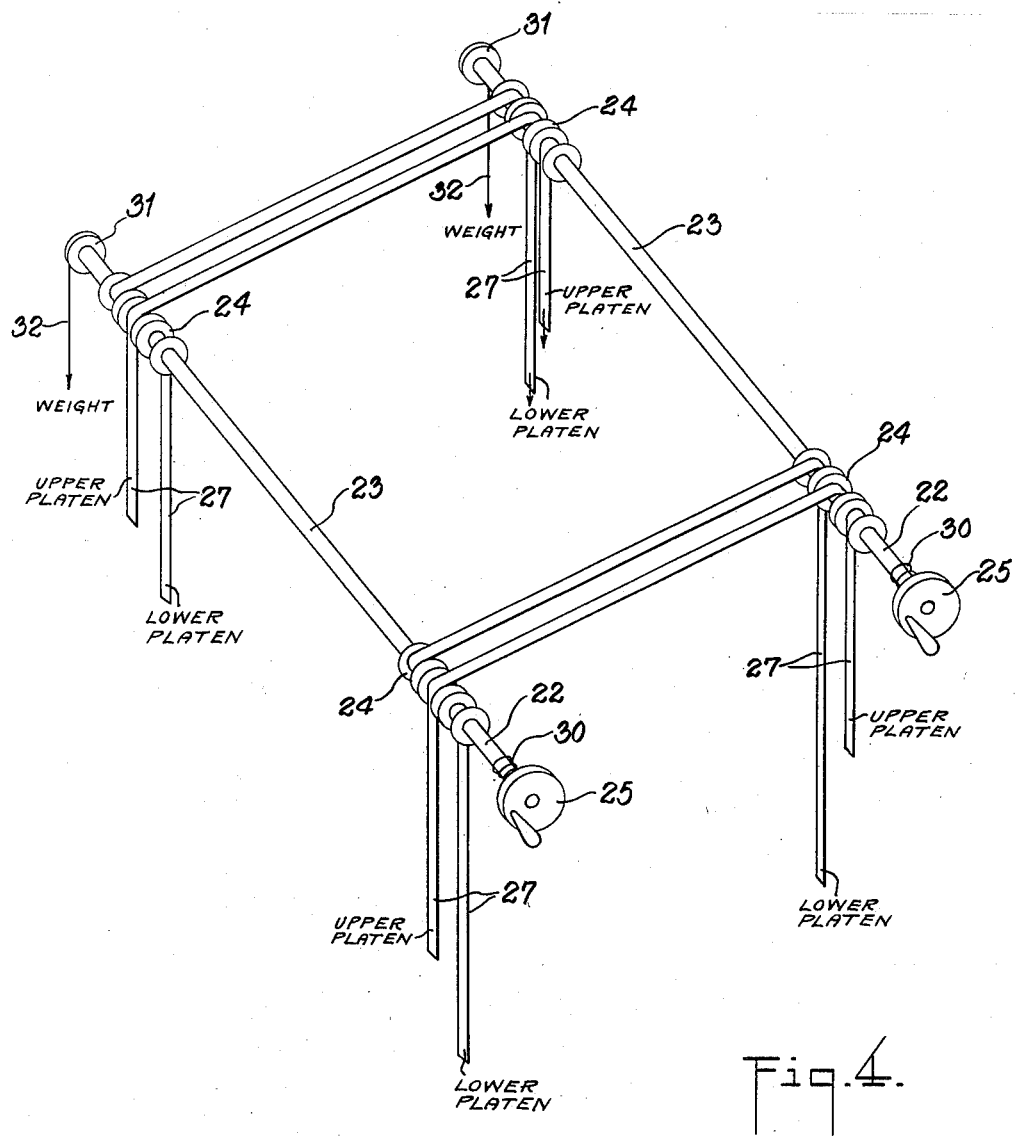

The invention is illustrated in the accompanying drawings wherein:

Figure 1 is a perspective view of the apparatus;
Figure 2 is a sectional view on line 2—2 of Figure 1;
Figure 3 is a sectional view on line 3—3 of Figure 1; and
Figure 4 is a perspective view of the apparatus with the top removed and a portion of the walls of the cabinet cut away, showing diagrammatically the arrangement of windlasses and tapes adapted to move the platens.

The optical projection apparatus of my invention is enclosed in an upright cabinet 1 having a transparent image plate 2 mounted horizontally in the top 3 thereof. The image of an object, as explained more fully hereinafter, is projected onto this horizontally mounted image plate so that it can be manually traced or reproduced or can be photographed by exposing photo sensitive paper to the upper side of the image plate. It is readily seen that the image plate is so positioned that work done thereon can be readily accomplished.

An opaque flat photo exposure member 4 hinged at one edge by hinge 5 to the top of the cabinet is adapted to rotate on said hinge to cover the image plate. This opaque member may be used when using the apparatus to photograph images by inserting photo sensitive paper between the image plate and the said opaque member 4 when rotated to a substantially horizontal position and exposing the paper by illuminating the image onto the image plate. The cabinet is provided with a door 6 in one wall thereof which allows access to the interior of the cabinet.

Referring to Figures 2 and 3 the object to be projected which can be printed matter, two dimensional design matter, three dimensional matter, etc. is supported on an object supporting platen 7 which is movable and substantially parallel to the image plate 2. A lens supporting platen 8 is also substantially parallel to the image plate and is disposed below said plate and above the object supporting platen. Disposed in said lens supporting platen is a lens 9 and it will be apparent that any object supported on the object supporting platen 7 properly illuminated will be projected through said lens onto the image plate. It will be further apparent that by moving the object supporting platen in a vertical direction the image size will be varied and at any image size setting a movement of the lens supporting platen 8 in a vertical direction will focus the lens 9 with a resultant clear image.

A light source, such as the swivel sockets 10 attached to the under side of the lens platen and bulbs 11, is disposed to light up and object supported on the object supporting platen. In the event that transparent objects are being used a second light source, such as the socket 12, bulb 13 and reflector 14 attached by brackets 15 to the underside of the object supporting platen, is used with the transparent object resting on a transparent object platen or as shown on a transparent insert 16 in the normally opaque object supporting platen 7. It is desirable to have an opaque bellows 16a interconnecting the perimeter of the image plate with the lens supporting platen 8 to shield the image plate from any other light than that passing through the lens 9.

A practical problem in a closed apparatus as described herein is a transfer of the heat generated by the light source to the working area or image plate. To overcome this problem and ventilate the cabinet a fan 17 is attached to the under side of the lens supporting platen by brackets 18. This fan is wired to turn on with either of the light sources and faces a vertically extending aperture 19 formed in a wall of the cabinet 1. The electrical circuit for the light sources and fan are not shown. Further to overcome this heating problem, an L-shaped shield 20 is attached to the underside of the lens supporting platen at each corner to reflect heat away from the aperture between the platen and the walls of the cabinet. These shields further serve to prevent the object supporting platen from hitting the bulbs 11 or fan 17. Also, referring to Figure 1, ventilating apertures 21 are formed at the corners of the image plate to permit the escape of any heat rising up under this top and further to allow air to pass into and out of the bellows protected area between said plate and the lens supporting platen when the latter is moved.

It is essential that the platens move and be controlled in movement independently of one another. The means of accomplishing this result is best shown in Figure 4 wherein a pair of windlasses 22, each comprising a shaft 23, a plurality of drums 24, and a handle 25 in the form of a wheel, are rotatably mounted in bearings 26 set in opposing walls of the cabinet. Attached to the periphery of each drum 24 is a flat tape 27 which winds on the drum when the windlass is rotated. Flat tape is preferred because each tape winds and lifts uniformly as the diameter of the drum and layers of tape thereon increase uniformly. Every tape 27 attached to the drums of one windlass interconnect said drums to one of the platens; thus the turning of one windlass results in a winding of the tapes attached thereto with a resultant vertical movement of a platen. As shown there are four tapes 27 connected to each platen at the four corners thereof so that a rotation of a windlass results in a positive vertical lift or descent of the corresponding platen.

The particular windlass and tape arrangement is illustrated by assuming in Figure 4 that the left-hand windlass is the controlling windlass for the lower or object supporting platen 7. Proceeding along the shaft 23 of said windlass, the tape 27 attached to the periphery of the first drum 24 interconnects this drum with the front left-hand corner of the object supporting platen, the tape necessarily extending slideably through the upper or lens supporting platen 8. The third drum 24 along the shaft 23 is interconnected by a tape 27 to the front right-hand corner of the object supporting platen, the tape extending from said drum horizontally across the cabinet and slideably over a drum 24 attached to the shaft 23 of the other windlass and down slideably through the lens supporting platen to the said front right-hand corner. A similar arrangement of drums, tapes and tape paths is provided for each corner thus giving the desired positive, vertical movement to a platen with the rotation of a windlass.

It is important, in order to avoid any distortion of the image, that the lens supporting platen and the object supporting platen be not only, parallel to each other but also parallel to the image plate. This is accomplished by providing a means for varying the length of each tape 27 individually, such as by interposing a turnbuckle in the tape or as shown by attaching each tape 27 to the platen with an adjustable bolt 28. To further assure a true vertical and parallel movement of the platens a vertically extending guide means contacting the platens is provided, such as the vertically extending posts 29 extending slideably through the platens.

Due to the weight of each platen it is necessary to provide a braking action against vertical fall of the platens. A brake and clutch arrangement may be attached to each shaft for this purpose. As shown a helical spring 30 is disposed around each shaft 23 between the handle 25 and the adjacent wall of the cabinet which provides a spring bias against the turning of the windlass. Also provided is a reel 31 attached to each shaft 23 having attached to the periphery thereof a cable 32 which interconnects the reel with a weight 33. The cable extends over the reel in such a manner that the weight connected thereto tends to rotate the windlass in the opposite direction from the direction the weight of the corresponding platen tends to rotate the windlass, thus acting as a braking means against this latter rotation.

It is desirable to have a means of visually ascertaining the height of each platen independently. A flat tape 34 attached to each platen and having numerals 35 on the exposed face thereof rides over a roller 36 adjacent the top of the cabinet and a slot 37 in the top of cabinet provides visual access to the exposed side of the tape. As a platen moves in a vertical direction the tape 34 connected thereto rides over the roller 36 and the numerals 35 may be calibrated to indicate the height of said platen. As shown one end of said tape 34 is attached to a platen and the other end to a weight 38 to provide for automatic movement of the tape as the platen moves vertically.

It is believed that the operation of my invention is clear from the foregoing description and without intending to limit myself thereby but only by the following, I claim:

1. An optical projection apparatus comprising an upright cabinet having four joined side walls, a base, and a transparent plate mounted horizontally in the top thereof, a movable opaque lens supporting platen disposed within said cabinet substantially parallel to said transparent plate, a lens mounted therein, a continuous opaque bellows interconnecting the periphery of said transparent plate and said lens supporting platen, a movable object supporting platen disposed within said cabinet below said lens supporting platen and substantially parallel thereto, a transparent plate mounted in said object supporting platen, the side edges of said platens being slightly spaced from the walls of said cabinet, a first light source adjacent the under side of said lens supporting platen, a second light source disposed between said object supporting platen and said base, a door in a first wall of said cabinet providing access to said platens, a second wall having a vertically extending aperture therein, a fan attached to the under side of said lens supporting platen facing said aperture, a shield attached to and extending vertically downward from the under side of each corner of said lens supporting platen, a pair of vertical guide members extending from the top to the base of said cabinet and slideably contacting said platens, a pair of windlasses rotatably mounted adjacent the top and extending through two opposing walls of said cabinet, and adapted to control the vertical heights of said platens, a plurality of winding drums mounted on said windlasses intermediate said walls, a flat tape interconnecting each drum mounted on one of said windlasses to a corresponding platen whereby rotation of one of said windlasses will cause the tapes to wind on said drums and cause one of said platens to move in a vertical direction, a means of adjusting the lengths of said tapes independently of each other, a handle attached to a portion of each of said windlasses extending through a wall of the cabinet and a helical spring surrounding each of said portions and disposed between said handles and said wall adapted to spring bias said windlass against turning, a reel attached to each windlass, a pair of weights, and a cable interconnecting the periphery of each reel to one of said weights thereby counteracting the turning of each windlass due to the weight of the platen controlled thereby.

2. An optical projection apparatus comprising an upright cabinet having four joined side walls, a base, and a transparent image plate mounted horizontally in the top thereof, a movable opaque lens supporting platen disposed within said cabinet substantially parallel to said transparent plate, a lens mounted therein, a movable object supporting platen disposed within said cabinet below said lens supporting platen and substantially parallel thereto, a light source adjacent the under side of said lens supporting platen, a door in a wall of said cabinet providing access to said platens, a pair of windlasses rotatably mounted adjacent the top and extending through two opposing walls of said cabinet and adapted to control the vertical heights of said platens, a plurality of winding drums mounted on said windlasses intermediate said opposing walls, a flat tape interconnecting each drum mounted on a windlass to a corresponding platen whereby rotation of a windlass will cause the tapes to wind on said drums and cause a platen to move vertically with respect to the image plate and with respect to the other platen, thereby varying the size of the image and focusing the lens and a handle attached to a portion of each of said windlasses extending through a wall of the cabinet and a helical spring surrounding each of said portions disposed between said handles and said wall adapted to spring bias said windlasses against turning.

References Cited in the file of this patent
UNITED STATES PATENTS

| 1,398,671 | Brown | Nov. 29, 1921 |
| 1,606,955 | Montigny | Nov. 16, 1926 |
| 1,635,014 | Smith | July 5, 1927 |
| 1,748,523 | Smith | Feb. 25, 1930 |
| 2,362,601 | Wenzel | Nov. 14, 1944 |

FOREIGN PATENTS

| 617,014 | France | Nov. 8, 1926 |
| 695,538 | France | Sept. 30, 1930 |
| 821,043 | France | Aug. 17, 1937 |